United States Patent [19]
Jilkén

[11] Patent Number: 4,773,789
[45] Date of Patent: Sep. 27, 1988

[54] ARRANGEMENT FOR SECURING A BODY

[76] Inventor: Leif Jilkén, Ystadsvägen 12, S-852 65 Sundsvall, Sweden

[21] Appl. No.: 75,060
[22] PCT Filed: Nov. 12, 1986
[86] PCT No.: PCT/SE86/00517
 § 371 Date: Jun. 12, 1987
 § 102(e) Date: Jun. 12, 1987
[87] PCT Pub. No.: WO87/03060
 PCT Pub. Date: May 21, 1987

[30] Foreign Application Priority Data
Nov. 14, 1985 [SE] Sweden ................ 8505395

[51] Int. Cl.$^4$ ............................. B25G 3/28
[52] U.S. Cl. ..................... 403/277; 403/409.1; 403/404
[58] Field of Search ........... 403/277, 275, 409.1, 403/404

[56] References Cited
U.S. PATENT DOCUMENTS
3,085,305  4/1963  Colombet et al. ............. 403/275
3,226,805  1/1966  Scott et al. ................. 403/275 X
3,367,686  2/1968  Kurz ......................... 403/277
3,716,894  2/1973  Kingston et al. ............. 403/275

Primary Examiner—Andrew V. Kundrat
Attorney, Agent, or Firm—Albert L. Jeffers

[57] ABSTRACT

The invention relates to an arrangement for securing a body made of an anisotropic material, the fibers of which are arranged essentially in an anticipated direction of application of a load. The arrangement consists of an outer casing made of a rigid material relative to the material of the body, into which outer casing one end of the body is capable of being introduced, and a wedge device arranged in the aforementioned direction and capable of being introduced into the aforementioned end so arranged upon being introduced to cause the end of the body to expand and in so doing to force its peripheral surface against the walls of the outer casing. Characteristic features of the invention are that the moduli of elasticity, $E_{ij}$, the moduli of shearing, $G_{ij}$, and the indices of transverse contraction, $V_{ij}$, of the wedge are substantially identical with those of the body in the longitudinal and transverse directions and in thickness.

1 Claim, No Drawings

ARRANGEMENT FOR SECURING A BODY

BACKGROUND OF THE INVENTION

1. Field of the Invention

The present invention relates to an arrangement for securing a body made of an anisotropic material, the fibres of which are arranged essentially in an anticipated direction of application of a load, consisting of an outer casing made of a rigid material relative to the material of the body, into which outer casing one end or edge of the body is capable of being introduced, and a wedge device arranged in the aforementioned direction and capable of being introduced into the aforementioned end or edge, so arranged upon being introduced as to cause the end of the body to expand and in so doing to force its peripheral surface against the walls of the outer casing.

2. Description of Related Art

Such arrangements of a previously disclosed kind are concerned primarily with the problem of providing a means of securing a wire or a splice in an electrical conductor, that is to say the bodies which are to be secured are in the form of a metal structure. An end connection for a wire is previously disclosed in U.S. Pat. No. 3,160,924, for example, and SE.A.163,353 describes an arrangement for the splicing of electrical cables. An end connection or splice of this kind exhibits totally acceptable tensile strength in the case of an end connection for a steel wire or a splice in a copper conductor.

SUMMARY OF ART PROBLEMS

When the body is of an anisotropic material, it has been found that a connection provided in a conventional fashion will withstand a load which is unacceptably low in many applications, which could possibly explain the comparatively infrequent use of combinations of unidirectional reinforced plastics and an arbitrary metal structure. The following has been established through tensile testing: if the tensile strength of a homogeneous bar of an anisotropic material, such as a unidirectional reinforced plastic, is taken to have the value 1, a bolted or rivetted connection will provide a tensile strength of 0.2–0.4, whereas a connection of the kind referred to by way of introduction using a wedge made of metal will provide a tensile strength of 0.5–0.6. This comparatively low value can be attributed to the fact that the stresses in the anisotropic material are concentrated at the tip of the wedge, which constitutes a fracture initiation point and results in the breaking of the fibres, initially at this point and subsequently in a plane running transversely to the aforementioned point.

DESCRIPTION OF PREFERRED EMBODIMENT

The present invention makes available a connection of the kind referred to by way of introduction which will withstand a higher loading than that which has previously been achieved, namely of the order of magnitude of 0.85–0.95 of the tensile strength of a homogeneous bar, this being permitted in accordance with the invention in that the moduli of elasticity, $E_{ij}$, the moduli of shearing, $G_{ij}$, and the indices of transverse contraction, $v_{ij}$, of the wedge being used in the invention is substantially identical with those of the body in the longitudinal and transverse directions and in thickness.

Approximately uniform material stresses are achieved through the invention, that is to say no concentration of material stresses is present at the tip of the wedge, and thus no fracture initiation point.

I claim:

1. A means for securing a body made of an anisotropic material, the fibres of which are arranged essentially in an anticipated direction of application of a load, comprising an outer casing made of a rigid material relative to the material of the body, into which outer casing one end of the body is introduced, and a wedge device arranged in the aforementioned direction and introduced into the aforementioned end to cause the end of the body to expand so as to force its peripheral surface against the walls of the outer casing, characterized in that the moduli of elasticity, $E_{ij}$, the moduli of shearing, $G_{ij}$, and the indices of transverse contraction, $v_{ij}$, of the wedge are substantially identical with those of the body in the longitudinal and transverse directions and in thickness.

* * * * *